A. W. BARKER.
NATURAL GAS SEPARATOR.
APPLICATION FILED FEB. 9, 1909.
927,476.
Patented July 13, 1909.
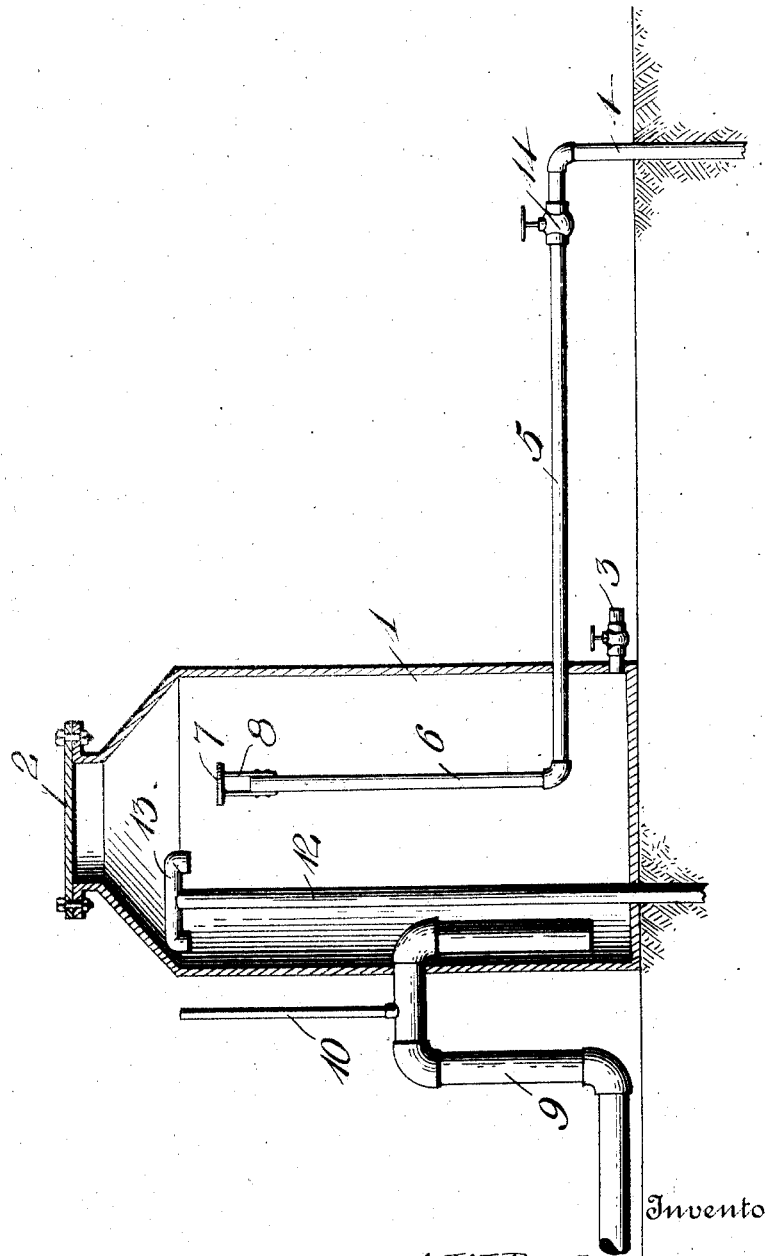
Witnesses
C. H. Griesbauer
Inventor
A. W. Barker
By H. B. Willson & Co.
Attorneys

UNITED STATES PATENT OFFICE.

ARTHUR W. BARKER, OF FORT PIERRE, SOUTH DAKOTA.

NATURAL-GAS SEPARATOR.

No. 927,476.      Specification of Letters Patent.      Patented July 13, 1909.

Application filed February 9, 1909. Serial No. 477,016.

*To all whom it may concern:*

Be it known that I, ARTHUR W. BARKER, a citizen of the United States, residing at Fort Pierre, in the county of Stanley and State of South Dakota, have invented certain new and useful Improvements in Natural-Gas Separators; and I do declare the following to be a full, clear, and exact description of the invention, such as will enable others skilled in the art to which it appertains to make and use the same.

This invention relates to improvements in natural gas separators.

The object of the invention is to provide a device of this character by means of which the gas may be entirely separated from the water flowing from Artesian wells thus saving the gas for use as fuel or for lighting purposes, as well as purifying the water to a sufficient extent to be employed for purposes, other than for human use.

With the foregoing and other objects in view, the invention consists of certain novel features of construction, combination and arrangement of parts as will be more fully described and particularly pointed out in the appended claims.

In the accompanying drawings, is shown a vertical section of my improved gas separator.

Referring more particularly to the drawings, 1 denotes a tank which may be constructed of concrete, sheet metal or any other suitable material and in any suitable size. The upper end of the tank is closed except for a man-hole formed therein, said man-hole being covered by a suitable closing plate 2. In the lower portion of the tank is arranged a drain pipe 3. The Artesian well pipe 4 is connected to the tank by a pipe 5 which enters the tank near its lower end and is provided within the tank with an upwardly projecting discharge tube 6, on the upper end of which is arranged a sprayer 7 which may be of any suitable construction, but which is here shown as preferably consisting of a flat plate which is secured to and spaced above the upper open end of the tube 6 by supporting rods 8.

Connected with the tank 1 is an over-flow pipe 9, the inner end of which extends downwardly in the tank and opens a short distance above the bottom of the tank, as shown. In the highest portion of the pipe outside of the tank is arranged a vent pipe 10 to prevent siphoning. In the tank is also arranged a gas discharge pipe 12, said pipe being arranged in the tank in any suitable manner so that the open end is at the upper end of the tank. The pipe 12 is here shown as extending upwardly through the bottom of the tank to near the upper end thereof and is provided on its upper end with a T head 13, the outer open ends of which are turned downwardly to receive the gas from the upper portion of the tank. The outer end of the gas conducting pipe 12 may be connected with a pipe line or with a storage tank, not shown.

In the operation of the device, the water from the well flows through the pipe 5 and tube 6 and is discharged from the tube 6 against the sprayer 7 which breaks the water up into small particles and separates the gas therefrom. The gas after being thus liberated from the water passes out through the T head 13 and gas conducting pipe 12 to the pipe line or tank from which it is taken for use for fuel or for lighting purposes. The water after thus being broken up, passes out through the overflow pipe and is conveyed thereby to a place of use.

The water conducting pipe from the well 4 is provided with a regulating valve 14, whereby the supply of water to the tank may be controlled. Should the water entering the tank contain more gas than is utilized or can be carried off by the pipe 12, the pressure of the gas thus accumulating in the tank will force the water down below the open end of the discharge pipe and will escape through said pipe thus preventing the bursting of the tank from an overpressure of the gas. As soon as the gas has thus liberated itself through the over-flow pipe, the water will again rise therein and will remain at a level with the upper portion of the over-flow pipe until the gas in the tank again reaches a pressure sufficient to force the water down and out of the over-flow pipe. By this arrangement, the danger of the bursting of the tank from an overpressure of the gas is entirely eliminated.

By means of a separating device such as herein shown and described, all of the gas contained in the water may be separated therefrom and the gas utilized for fuel or lighting purposes, while the water is purified to a sufficient extent to permit the use thereof for many purposes.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim as new and desire to secure by Letters-Patent is:

1. A gas separating device for Artesian wells, comprising a closed tank, a water conducting pipe to connect said tank with the well pipe, a sprayer arranged on the upper end of the water conducting pipe to break the water discharged therefrom into small particles and thereby liberate the gas therefrom, a gas conducting pipe extending into the tank, a water over-flow pipe connected to the lower portion of the tank, and a vent arranged in said over-flow pipe to prevent the siphoning of the water from the tank.

2. In a gas separating device for Artesian wells, a closed tank, a water conducting pipe to connect said tank to the well pipe, means on the upper end of said water conducting pipe to break up or spray the water discharged therefrom, a regulating valve arranged in said water conducting pipe, a gas conducting pipe extending up through the tank, a T head on the upper end of said pipe, said T head having downwardly projecting open ends to receive the gas from the upper end of the tank, a water discharge pipe arranged in the tank, and extending to near the bottom thereof, and a vent tube arranged in said over-flow or discharge pipe.

In testimony whereof I have hereunto set my hand in presence of two subscribing witnesses.

ARTHUR W. BARKER.

Witnesses:
T. R. STRAIN,
MATHILDE GOLDSMITH.